Jan. 28, 1964   H. H. KUNZI ETAL   3,119,427
COMMINUTING MACHINE
Filed Dec. 1, 1961
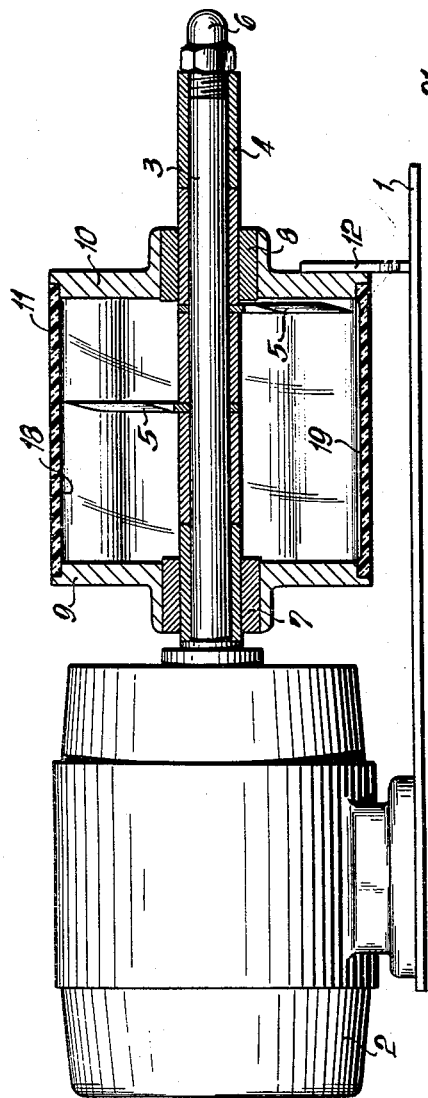
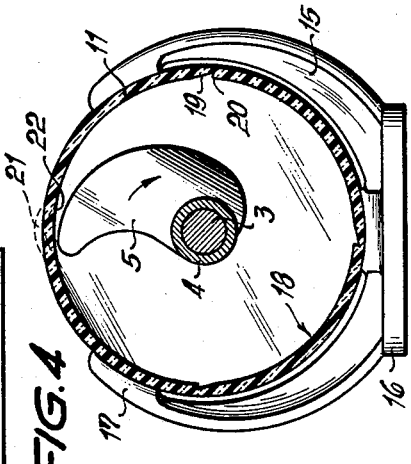
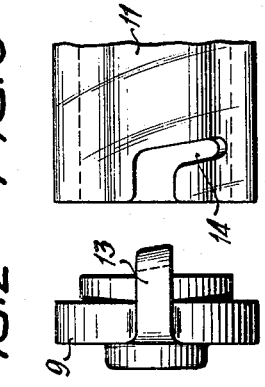
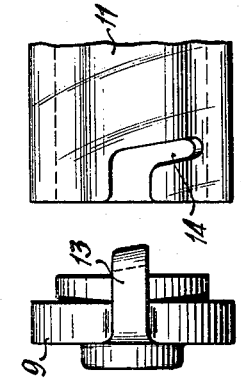

3,119,427
COMMINUTING MACHINE
Hugo Hermann Kunzi and Hugo Siegfried Kunzi, both of Leobenerstrasse 82, Stuttgart-Feuerbach, Baden-Wurttemberg, Germany
Filed Dec. 1, 1961, Ser. No. 156,460
Claims priority, application Germany Dec. 7, 1960
2 Claims. (Cl. 146—67)

The present invention concerns a machine for comminuting meat, onions and other sinewy or stringy material having a tough structure, which is charged in a container and comminuted by means of one or more cutting blades.

Machines are known in which cutters or sets of cutters are directly connected on the end of the shaft of a static motor, a conical container being provided for the material to be comminuted into the lower portion of which project the cutters. The material to be comminuted which is situated in the range of the cutters is urged outwardly against the container wall and along it in an upward direction, and from the centre of the container further material to be comminuted again gets into the cutter range. Thus there is provided a certain circulatory movement of the material in the transverse and longitudinal direction of the container.

These known machines have proved unsuitable however when stringy material, which is tough in structure, has to be loosened and comminuted without losing the valuable nutrients or enzymes by a crushing action whereby the material becomes unpleasantly discoloured.

When processing meat or onions the resultant product is a pulpy mass.

It has been proposed to convey such delicate material by means of a worm into an annular chamber, the inner and outer circumference of which is provided with oppositely acting annular cutters.

An object of the present invention is to provide a comminuting machine of simple construction and with only few components so that the material to be comminuted no longer reaches the cutters due to pressure by centrifugal action, but is arranged in position against the inner wall surfaces of the container in suitable surface recesses in co-operation with the cutter surfaces, in constant succession for the cutting procedure.

A further object of the invention is to provide a machine which is easy to clean after use.

According to the present invention a machine for comminuting shreddable material, more especially meat, onions and the like, which are stringy, sinewy and tough, comprises a cylindrical container for the material to be communited which is closeable at both end faces by cover plates, a revolving shaft being mounted in the cylinder which is fitted with at least one cutter such that there is a slight clearance between the or each cutter and the inner circumferential surface of the container, the inner surface of the cylinder having at least one recess forming a longitudinal edge extending from cover to cover, the container and the shaft being displaceable in an axial direction relative to one another. The revolving shaft carrying the cutter may conveniently be the shaft of an electric motor. The or each cutter mounted on the revolving shaft may have clamping bushes slid thereon which are clamped in position by means of a clamping screw.

Bearing bushes, associated with the cover plates, may be supported by the clamping bushes. At least one of the cover plates of the container may be fixed thereon by means of a quick release closure, for example a bayonet closure.

A charging or emptying opening, adapted to be closed, may be provided on the cylindrical part of the container; alternatively, the charging or emptying opening, adapted to be closed, may be provided on one of the cover plates.

A handle-like lever supported against an abutment may be mounted on the container or on one of its covers.

In one embodiment of the invention a pedestal bearing engages the container with grippers and is provided with a flange and adapted to be axially displaced relative to a motor base plate for holding the container.

The surface recess on the inner circumferential surface of the container may be formed by means of a recess in the surface of the cylinder or by means of bossing out the cylinder itself. The cylinder and associated parts may be mounted so as to be pivotal.

The axial relative movement between the shaft carrying the cutters and the container for the material to be cut may be effected by means of a crank drive or the like.

The invention will now be described further, by way of example, with reference to the accompanying drawings, in which:

FIG. 1 is an elevation of the machine, partly in section, connected to a motor;

FIGS. 2 and 3 are details of the quick release closure between container and end face cover; and FIG. 4 is a cross-section, partly in elevation, of a container for material to be cut being held in another modification not shown in FIG. 1 by means of grippers provided on a pedestal bearing.

A shaft 3 projects freely from one end of a motor 2 mounted on a base plate 1. The motor shaft 3 may however project from both ends of the motor housing.

Several clamping bushes 4 are slid on to the shaft 3 clamping cutters 5 between them at spaced relationships from one another. Clamping is effected by means of a clamping screw 6 engaging in a female thread of the shaft 3. Bearing bushes 7 and 8 are slid over the clamping bushes 4; the mounting of the bearing bush 7, on the motor side, has to be effected prior to the mounting of the cutters 5 disposed between the clamping bushes 4.

The bearings 7 and 8 are associated with cover plates 9 and 10, which wholly or partly close the ends of a cylinder 11 consisting of transparent material.

In the embodiment shown, a lever 12, serving as handle, is fixed on the cover plate 10 rigidly connected to the cylinder 11, which lever 12 is adapted to be supported against the base plate 1 preventing the container 11 from rotating.

The cover 9 is detachably connected to the cylinder 11 by means of the bayonet closure, shown in FIGS. 2 and 3, comprising a hook-like member 13 on the cover 9 and a slot 14 suitable therefor, on the outer surface of the cylinder 11. Due to the shape of the slot 14 the cover is firmly clamped on the cylinder.

It is possible to provide packing rings in place of the bearing bushes 7 and 8 if, as shown in the embodiment illustrated in FIG. 4, the container 11 is gripped by a pedestal bearing 15 having a flange 16 and grippers 17, the bearing being displaceably arranged in an axial direction on the motor base plate 1.

The cylinder 11 is provided at its inner circumferential surface 18 with one or more notches 19, of triangular cross-section which are so disposed that set back areas and longitudinal edges 20 are obtained on the inner circumferential surface of the cylinder. The longitudinal edges 20 are preferably sharp-edged. Bosses 21 may be provided on the cylindrical container 11 in place of the notches 19 or additionally thereto, which bosses form an edge 22 seen in the direction of rotation of the cutters at their transition into the circumferential surface 18 of the cylinder.

The cylinder 11 can be removed or replaced from the cover 9 after releasing the bayonet fitting 13, 14 for charging and emptying the material to be cut. During rotation of the cutters 5 the container 11 is reciprocated by means of the lever 12 in the form of a handle, so that the material to be cut which is disposed in the bottom of the container is constantly cut through by the cutters 5, in co-operation with the centrifugal force applied to the circumferential surface acting with a cutting effect.

The reciprocation of the container for the material to be cut may also be effected by way of a crank drive or the like (not shown).

When comminuting material which is less stringy, such as a vegetable, it is possible to substitute the container by one having no inner recesses.

We claim:
1. A machine for comminuting shreddable material of the type comprising meat, onions and the like which is stringy, sinewy and tough, comprising in combination a prime mover, a container for accepting the material to be comminuted having a cylindrical surface and a cover plate at each axial extremity of said cylindrical surface, one cover plate being removable for insertion of shreddable material, axial holes provided in each said cover plate into which bearing bushes are inserted, a shaft mounted in clamping bushes which are mounted in said bearing bushes, said shaft being operatively connected to said prime mover and rotatable thereby, said shaft being journaled in the range of said bearing bushes and thereby passing through said container, cutters mounted on said shaft in said container such that there is a slight clearance between them and the inner cylindrical surface of said container, said container having at least one recess extending longitudinally of the inner cylindrical surface thereof.

2. A machine according to claim 1, wherein at least one of the cover plates of said container is retained on said cylindrical surface by means of a bayonet fitting.

References Cited in the file of this patent
UNITED STATES PATENTS

| | | |
|---|---|---|
| 1,686,953 | Brown | Oct. 9, 1928 |
| 1,974,501 | Marty | Sept. 25, 1934 |
| 2,742,937 | Herzer | Apr. 24, 1956 |
| 2,941,561 | Pavia | June 21, 1960 |
| 3,095,022 | Schmook | June 25, 1963 |

FOREIGN PATENTS

| | | |
|---|---|---|
| 438,410 | Germany | Dec. 17, 1926 |